United States Patent [19]

Malone et al.

[11] Patent Number: 4,944,160
[45] Date of Patent: Jul. 31, 1990

[54] THERMOSTATIC EXPANSION VALVE WITH ELECTRONIC CONTROLLER

[75] Inventors: Peter J. Malone, Elk Grove Village; Michael B. Thompson, Hoffman Estates; Robert J. Torrence, Addison; Marvin F. Gaudette, Rockton, all of Ill.

[73] Assignee: Eaton Corporation, Cleveland, Ohio

[21] Appl. No.: 473,066

[22] Filed: Jan. 31, 1990

[51] Int. Cl.$^5$ .............................................. F25D 17/00
[52] U.S. Cl. ........................................ 62/180; 62/184; 62/203; 62/227
[58] Field of Search ................... 62/180, 184, 227, 203

[56] References Cited

U.S. PATENT DOCUMENTS

| | | | |
|---|---|---|---|
| 4,120,173 | 10/1978 | Kimpel | 62/184 X |
| 4,395,886 | 8/1983 | Mayer | 62/160 |
| 4,474,022 | 10/1984 | Puskar | 62/96 |
| 4,490,987 | 1/1985 | Peterson | 62/186 |
| 4,614,087 | 9/1986 | Nadamoto et al. | 62/126 |
| 4,790,145 | 12/1988 | Thompson | 62/212 |

Primary Examiner—William E. Wayner
Attorney, Agent, or Firm—R. A. Johnston

[57] ABSTRACT

A refrigeration system employing a mechanical thermal expansion valve with a self-heated thermistor sensing saturation temperature at a high pressure inlet and a second thermistor sensing saturation temperature at the evaporator outlet. A microprocessor based controller compares the sensed temperature with stored limits and provides output signals to a relay for cycling the condenser fan responsive to high side pressure and the compressor clutch responsive to the low pressure side temperature. For low pressure drop evaporators, the second thermistor may be disposed at the evaporator inlet.

4 Claims, 3 Drawing Sheets

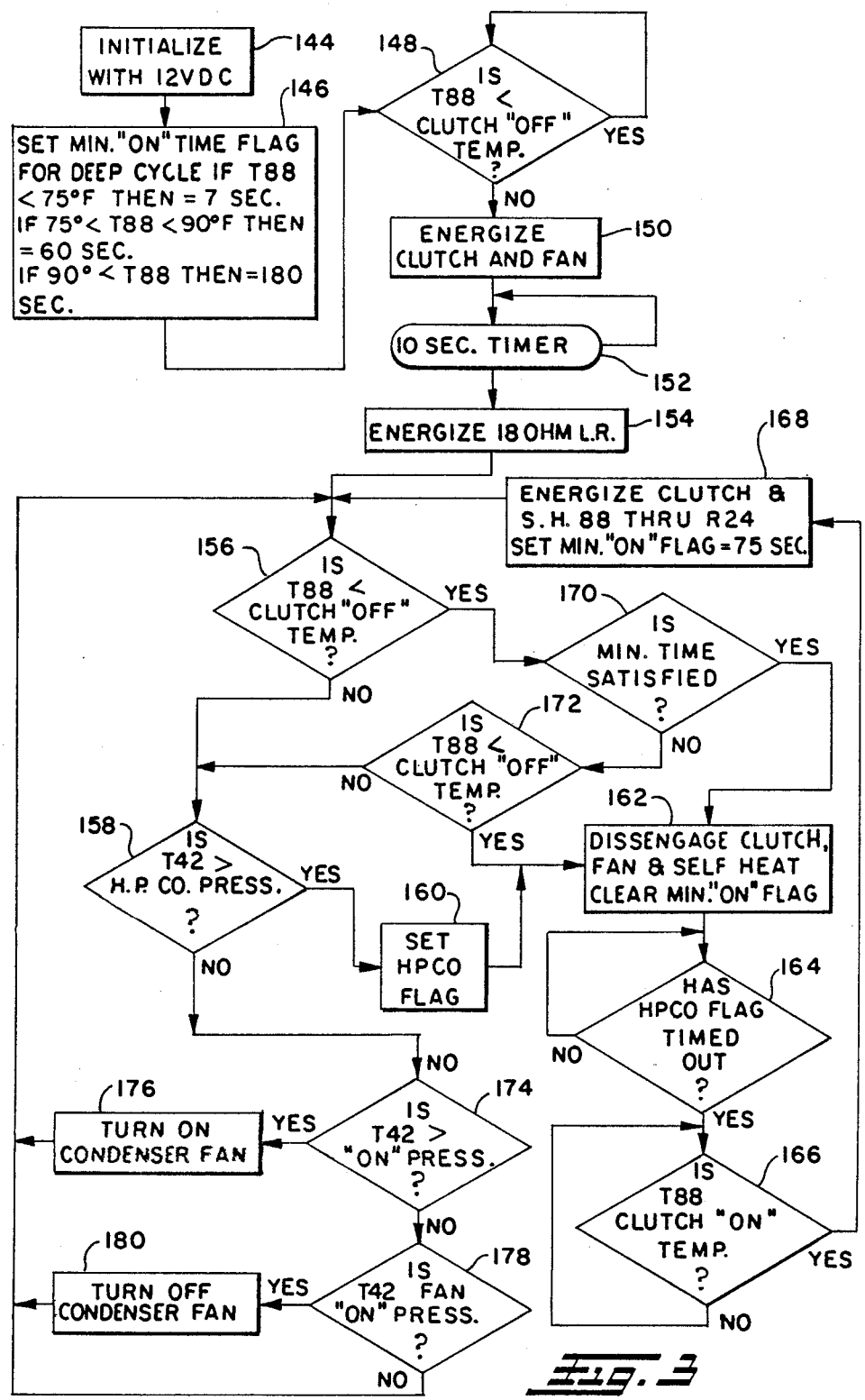

THERMOSTATIC EXPANSION VALVE WITH ELECTRONIC CONTROLLER

BACKGROUND OF THE INVENTION

The present invention relates to ways or means of controlling flow of liquid refrigerant in a liquid vapor refrigeration system of the type having a compressor for pumping pressurized refrigerant through a condenser and through an expansion means for low pressure circulation through an evaporator where heat is absorbed to effect vaporization of the liquid refrigerant and cooling the surrounding air and for returning the vaporized refrigerant to the compressor inlet. The present invention relates particularly to refrigeration systems on board an automotive vehicle for air conditioning the vehicle passenger compartment. Such automotive passenger compartment air conditioning systems are known to employ a thermal expansion valve having a liquid filled chamber in heat transfer thermal relationship with a refrigerant flowing to return to the compressor such that changes in the sensed temperature of the refrigerant create expansion or contraction of the liquid in the chamber to thereby provide pressure forces for moving a diaphragm to control movement of the flow control valve.

Thermal expansion valves of the above-described type are thus mechanically self-contained and function independently of the electrical controls employed for energizing and deenergizing the clutch for coupling the compressor to the vehicle engine. Heretofore, the compressor clutch has typically been energized and deenergized by a pressure switch disposed to sense the saturation pressure at the pressure discharge side of the evaporator or in the line between the expansion valve and the evaporator inlet. However, it has been desired to eliminate the pressure switch as a source of service problems particularly leakage in the switch or its connections to the line. It has further been desired to eliminate the pressure switch in view of the cost of providing a pressure switch having sufficient proof pressure rating yet sufficient accuracy for cycling the compressor in response to small changes in saturation pressure.

It has therefore been desired to employ a mechanical thermal expansion valve to benefit from the low cost and proven reliability thereof, and to provide an alternative to a pressure switch for cycling the compressor clutch in an automotive air conditioning system. It has further been desired to find a way or means of generating an electric signal in response to small changes of the saturation pressure in an automotive air conditioning system evaporator inlet line in a manner which would enable the use of a microprocessor to benefit from the sophistication of the control available from a microprocessor.

It has also been desired to provide a way or means of controlling an electrically operated condenser cooling fan in response to upper and lower limit conditions of refrigerant pressure and yet retain the use of a mechanical thermal expansion valve.

It is known for example as taught in U.S. Pat. No. 4,841,734, commonly owned with the present invention, to utilize a "self-heated" thermistor having a controlled current flow therethrough and to sense the voltage drop across a resistor in series with the thermistor and to convert the voltage drop to saturation pressure from a look-up table of known refrigerant properties in a refrigeration system and particularly an automotive air conditioning system. In the aforesaid patent the saturation pressure signal from a microprocessor is used to deenergize the compressor when excessive saturation pressure is detected. The self-heated thermistor is disposed on the pressure line near the inlet to the expansion valve means.

It is also known as taught for example in U.S. Pat. No. 4,835,976, commonly owned with the present application, to employ a self-heated thermistor in the suction line between the evaporator and the compressor inlet to determine the quality of the refrigerant flowing thereover for enabling a microprocessor to generate a control signal for pulsing a solenoid to operate an electric expansion valve.

It is known also, as taught in U.S. Pat. No. 4,794,762 to provide a thermistor at the inlet and outlet of the mechanical expansion means for providing a refrigerant temperature signal to a microcomputer from the high and low pressure side for comparison with high and low limits for fan and compressor clutch cutout.

SUMMARY OF THE INVENTION

The present invention provides for direct electrical sensing of the saturation temperature of the refrigerant in a refrigeration or air conditioning system. The present invention enables a microprocessor to generate, from a look-up table of the properties of the refrigerant, an electrical control signal to cycle the compressor when the saturation pressure determined from the look-up table is out of a desired range. The present invention employs a self-heated thermistor for the purpose of determining the saturation temperature.

The present invention employs the widely used relatively inexpensive to manufacture mechanical thermal expansion valve with the self-heated thermistor disposed at the high pressure inlet side of the valve. The signal generated by the microprocessor based on the saturation pressure is used to control cycling of the condenser cooling fan.

A separate thermistor is disposed in the low pressure discharge line from the evaporator to sense actual refrigerant temperature. In an alternative embodiment for low pressure drop evaporators, the second thermistor may be located in the low pressure inlet line to the evaporator.

The temperature sensed by the second thermistor is employed by a microprocessor to cycle the compressor clutch on or off based on temperature and the assumption that the temperature sensed by the second thermistor is basically saturation temperature.

The present invention thus eliminates the need for a separate pressure switch to sense saturation pressure for controlling compressor clutch cycling and utilizing a self-heated thermistor to determine the saturation pressure on the high pressure side of the system to control cycling of the condenser cooling fan.

BRIEF DESCRIPTION OF THE DRAWINGS

FIG. 3 is a flow diagram of the electrical control system generation of the system of FIG. 1.

DETAILED DESCRIPTION

Figure 1:
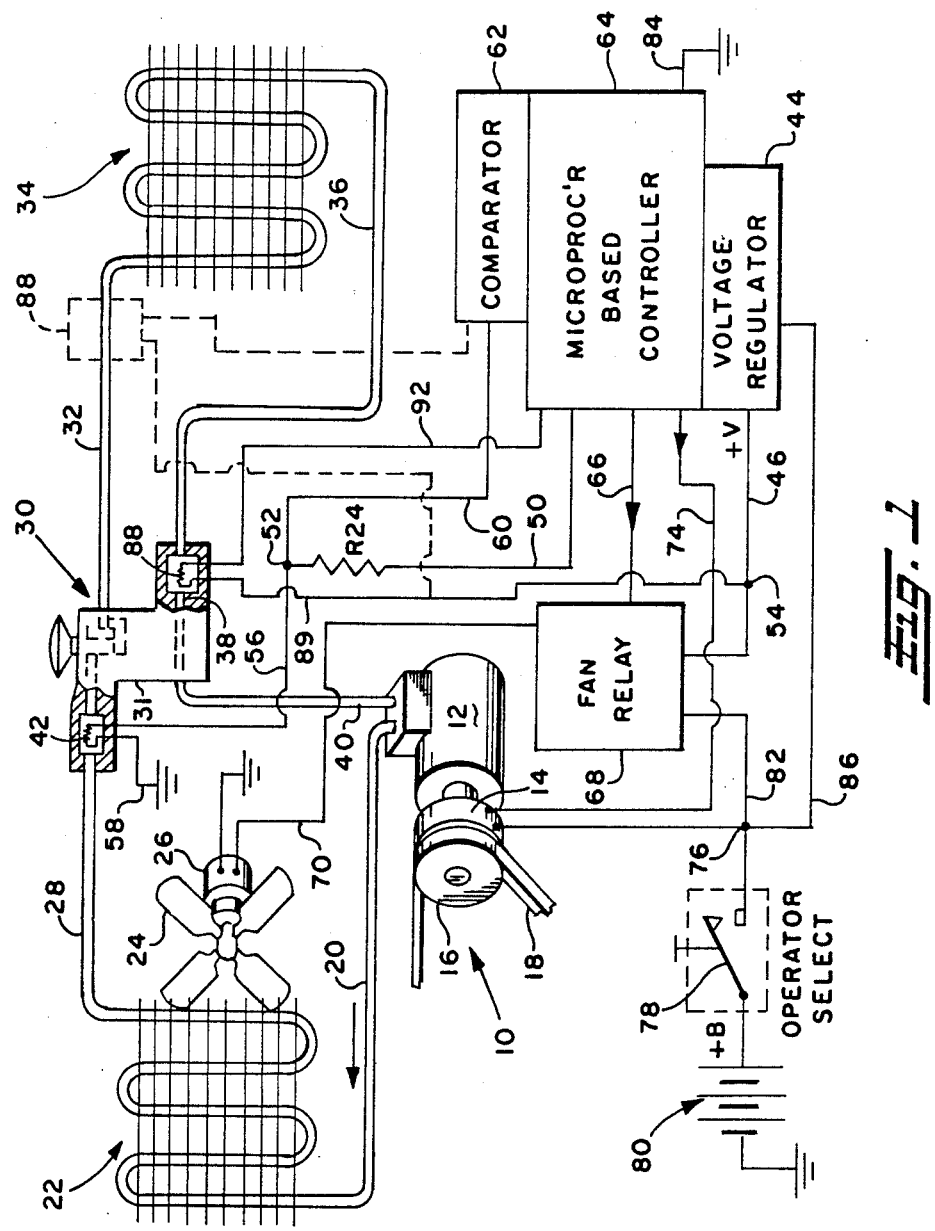
FIG. 1 is a pictorial schematic of the control system of the present invention.

Referring now to FIG. 1, the control system of the present invention, indicated generally at 10, has a refrigerant compressor 12 coupled by means of electric clutch 14 to a drive pulley 16 driven by belt 18 connected to a source of power, as for example the engine of an automotive vehicle.

High pressure refrigerant is discharged from the compressor through conduit 20 to the condenser indicated generally at 22 which is cooled by fan 24 driven by fan motor 26. The cooled liquid refrigerant discharges from the condenser through conduit 28 to the inlet of the expansion means such as the thermal expansion valve indicated generally at 30. The low pressure discharge of the thermal expansion valve 30 is discharged at the outlet thereof through conduit 32 to the inlet of evaporator 34 which absorbs heat from the surrounding air such as in the air in passenger compartment of a vehicle for providing passenger comfort therein. Evaporator 34 discharges through conduit 36 and through return passage 38 formed through the body 31 of expansion valve 30 and conduit 40 to the compressor suction inlet.

A self-heated thermistor 42 is disposed preferably in valve body 31 at the inlet for refrigerant flow thereover and receives a voltage from junction 52 through resistor R24 which is connected through lead 50 to controller 64. In the presently preferred practice the self-heated thermistor 42 is an NTC thermistor manufactured by Fenwall Electronics, 63 Fountain Street, Farmingham, Mass. 01701 and has an identification FD21J1-W and has a resistance of 100 OHMS at 25 degrees C. Junction 52 is also connected through lead 60 to one input of a comparator 62 which is controlled by the microcomputer or microprocessor based controller 64 which is powered by a power supply including voltage regulator 44.

A drive signal is provided along lead 66 from controller 64 to fan relay 68 which controls the fan motor 26 along lead 70. Fan relay 68 receives power for the motor along lead 82 from junction 76. The motor 26 has the opposite side thereof connected to the system ground along lead 72.

The controller 64 also connected along lead 74 to the compressor clutch 14 which receives power through junction 76 which is powered through the operator select switch 78 and the vehicle power supply indicated generally at 80. The controller 64 has its ground connected through lead 84 to the system ground; and, the voltage regulator 44 receives power through lead 86 and junction 76.

A second thermistor 88 is disposed in the evaporator discharge line 36 and preferably at the inlet of passage 38 in valve body 31. Thermistor 88 receives power directly from junction 54 along lead 89 and has the remaining lead 92 thereof connected to the comparator 62. The thermistor 88 may alternatively be located at the evaporator inlet as shown in dashed outline in FIG. 1; however, this alternative arrangement may be employed only where the evaporator 34 is of the type having a pressure drop thereacross generally not greater than about 20 psi (138 KPa).

Figure 2:
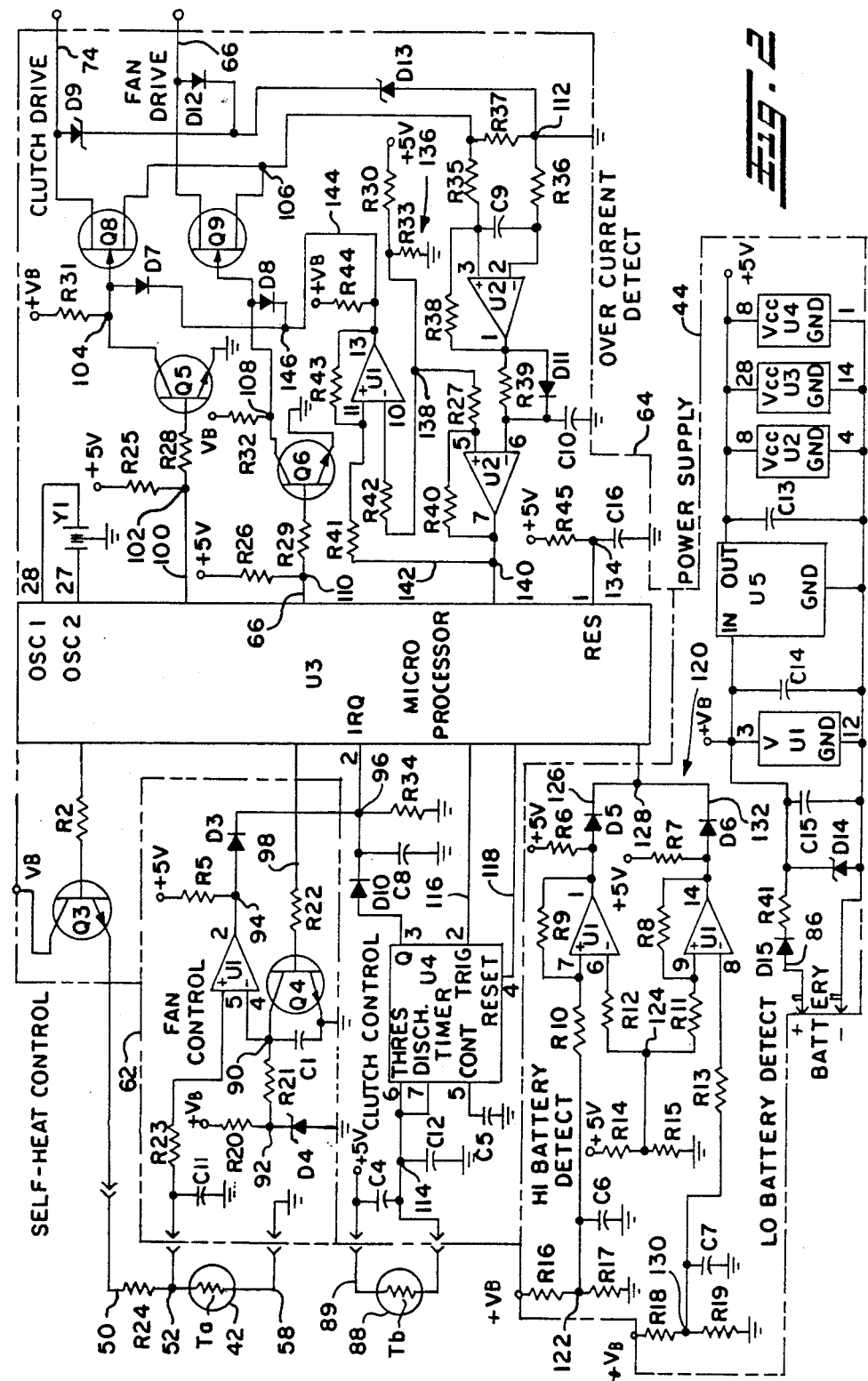
FIG. 2 is a schematic of the electrical circuit of the present invention.

Referring now to FIG. 2, the circuit schematic for the control system is shown wherein the power limiting resistor R24 receives power from the voltage regulator 44 along lead 50 and supplies current through junction 52 to the self-heated thermistor 42 which is grounded through lead 58 to the system ground.

The voltage at junction 52 comprises a reference voltage and is also applied along lead 60 through resistor R23 and to the positive input of comparator comprising a portion of device U1 at pin 5 thereof and U1 forms a part of comparator circuit 62 of FIG. 1. The negative input at pin 4 of U1 is connected through junction 90 to the collector of a transistor switch Q4 which has its emitter grounded and the base receiving a signal along lead 98 through resistor R22 from the microprocessor U3.

The microprocessor U3 employed in the present practice has a manufacturer's designation MC68HCO5TK and is available from Motorola Semiconductor Products, 2060 Elgonquin Road, Schaumburg, Ill. 60195.

The junction 90 is biased by the system voltage $V_B$ from power supply 44 through resistors R20 and R21 which have the junction 92 therebetween connected to ground through a reverse poled zener diode D4.

The comparator U1 has its output at pin 2 thereof connected through junction 94 and forward poled diode D3 through junction 96 to pin 2 of the microprocessor U3. Junction 96 is protected against transients by capacitor C8 and resistor R34 which are connected to ground.

The microprocessor U3 includes a ceramic resonator Y1 which provides a source of timing to the microprocessor through pins 27 and 28; and, in the presently preferred practice the resonator Y1 acts as an oscillator having a frequency of preferably four megaHertz.

The control circuit of the present invention receives power from the network 44 which includes a voltage regulator device U5 which provides a regulated five (5) volts D.C. The voltage regulator U5 is available from Motorola and has a manufacturer's designation MC7805BTD.

The device U5 is protected by capacitors C14 and C13 and transient suppressors comprising diode D15 and resistor R41 in series therewith and zenior diode D14 and compacitor C15 in parallel therewith. The network 44 provides a source of five volt power to the solid state devices U2, U3 and U4 and voltage $V_B$ of approximately 11–12 volts for powering other circuit components such as devices U1 and Q3.

In operation, the microprocessor U3 sends a signal through R2 to the base of a transistor switch Q3, turning Q3 "ON", which applies $V_B$ to R24 and causes current flow through self-heated thermistor 42. Q3 has its collector biased to a regulated voltage $V_B$ from the power supply and its collector connected through resistor R2 to the microprocessor for receiving a signal therefrom. Upon receipt of a signal from the device U3 along lead 98 through R22 to the base of Q4, Q4 is turned "ON"; and, Q4 keeps capacitor C1 discharged when Q4 is "ON". When the microprocessor turns Q4 "OFF" capacitor C1 charges; and the microprocessor starts counting internally. As the voltage on C1 exceeds the voltage on pin 5 of comparator U1, U1 conducts and provides a signal transition through junction 96 and pin 2 of the microprocessor and the microprocessor stops counting. The microprocessor U3 then reads the count as the saturation temperature from a look-up table of known properties of the particular refrigerant employed, U3 determines the saturation pressure. In operation, when the limited current flowing through the self-heated thermistor 42 causes boiling of the refrigerant thereon, variations in the temperature are sensed by detecting changes in the voltage drop across the resistor R24 as the voltage at junction 52, which is applied through resistor R23 to the positive input at pin 5 of U1.

This technique of determining the saturation pressure by measuring the saturation temperature is known and is described in the aforesaid U.S. Pat. No. 4,841,734 and further detail herein is omitted for the sake of brevity.

The microprocessor is operative in response to temperature measurement and determination of the saturation pressure by thermistor 42 at or below 240 psi 1656 (KPa) to provide an output signal along line 66 through resistor R29 to the base of transistor switch Q6. The microprocessor turns Q6 "OFF" at 180 Psi (1242 KPa) in the presently preferred practice. Q6 has its emitter grounded and collector connected through junction 108, which is biased through resistor R32 by the system voltage $V_B$. The input to the base of Q6 is biased through R26 by the five volt system power at junction 110. Junction 108 is connected to the base of the power switch device Q9 which has its output pin connected through lead 66 to the fan relay 68; and, the remaining output pin is connected to ground through junction 106.

In operation, when the thermistor 42 senses the saturation pressure below 240 psi (1656 KPa) microprocessor U3 provides a signal along lead 66 to turn "OFF" Q6 which in turn turns "ON" Q9 to energize the fan relay. When the thermistor 42 senses saturation pressure above 350 psi (2415 KPa) the microprocessor turns Q6 and Q9 "OFF" deenergizing the fan relay and compressor clutch.

The second thermistor 88 receives a regulated five volts from the voltage regulator 44 along lead 89 and the thermistor is connected to junction 114 which is connected to input pin 6 of device U4 which comprises a timer device bearing industry standard designation 555 and which upon receipt of a trigger signal at pin 2 thereof from the microprocessor U3 is operative to cause compacitor C12 to charge; and, the microprocessor U3 starts counting internally. When the voltage on C12 reaches the threshold voltage, U4 gives an output on pin 3 to the microprocessor U3 at pin 2 and causes the microprocessor counter to stop. The microprocessor then compares the voltage represented by the count with values in a look-up table for the particular refrigerant and the temperature derived from the table is assumed to be saturation temperature.

If the saturation temperature is above a desired value, the microprocessor is operative to emit a signal along lead 100 to Q5 which in turn turns Q8 "ON" to energize the compressor clutch. When the temperature as measured by thermistor 88 is determined to be below a second predetermined value, the microprocessor is operative to turn "ON" Q5 and turns Q8 "OFF" to deenergize the compressor clutch 14. Microprocessor U3 provides an output signal along lead 100 to junction 102 and through resistor R28 to the base of transistor Q5 which has its emitter grounded and its collector connected to junction 104. Junction 104 is biased through resistor R31 by the voltage $V_B$ and connected to the base of power switch device Q8, which applies power through its output junction along lead 74 to the compressor clutch 14.

Q5 is turned "ON", causing Q8 to be turned "OFF" by the microprocessor U3 when the temperature measured by
88 is below 18 degrees F. and turned "ON" when the temperature measured by $T_{88}$ is greater than 40 degrees F. The remaining lead of power switch Q8 is connected through junction 106 which is connected through resistor R37 to ground for completing the circuit to the compressor clutch.

Device U4 has pin 5 thereof grounded through capacitor C5 and pin 4 comprising a reset connected to the microprocessor by lead 118. The thermistor 88 in the present practice comprises a 30K OHM NTC thermistor available from Fenwall Electronics, 63 Fountain Street, Farmingham, Mass. 01701, and bears manufacturer's designation UUR43J21. Capacitor C4 is placed across the leads of thermistor 88 for transient suppression.

The output drivers Q8 and Q9 have their output lines protected against transients by the diode network comprising forward poled diode D9 connected to lead 74 and forward poled diode D12 connected to lead 66 in series with reversed poled zener diode D13 connected to junction 112. Power supply 44 includes a high and low battery voltage detection circuit indicated generally at 120 which applies the 11 volt system voltage $V_B$ to resistor R16 and R17 series connected to ground with the junction 122 therebetween connected to the positive input of a comparator comprising pin 7 of device U1 through limiting resistor R10. A transient suppression capacitor C6 is connected from junction 122 to ground. The negative input of the comparator comprising pin 6 of device U1 is connected through limit resistor R12 to junction 124 which is connected to the center tap between resistors R14 and R15 which are series connected to ground with the regulated five volt supply voltage applied to resistor R14. When the voltage from the divider comprising resistors R16 and R17 which may be expressed at follows:

$$V_{HI} = V_B \frac{(R17)}{(R16 + R17)}$$

exceeds the voltage from the divider receiving the regulated five volts which may be expressed as:

$$V_{REF} = V_5 \frac{(R15)}{(R14 + R15)}$$

the device U1 conducts through pin 1 and lead 126 through forward poled diode D5 to junction 128 which is connected to an input of the microprocessor U3.

In like manner, the system voltage $V_B$ is applied through resistor R18 to junction 130 which has connected thereto R19 which is grounded such that the resistors R19, R18 serve as a voltage divider; and, the voltage at junction 130 may be expressed as follows:

$$V_{LO} = V_B \frac{(R19)}{(R18 + R19)}$$

$V_{LO}$ is applied through limiting resistor R13 to a negative input at pin 8 of device U1 which has applied to a positive input at pin 9 thereof the voltage from junction 124 through limit resistor R11. The device U1 thus acts as a comparator and when the voltage at junction 130 $V_{LO}$ is less than the voltage $V_{REF}$ at junction 124, U1 conducts through its output pin 14 along line 132 through forward poled diode D6 to junction 128 and the input of the microprocessor. The output of U1 at pin 1 is provided with a positive feedback resistor R9 and is biased from the regulated five volt supply through resistor R6. Similarly, the output at pin 14 of U1 is provided with a positive feedback resistor R8 and is biased by the five volt regulated supply through resistor R7.

When the microprocessor receives a signal from junction 128 indicating that the battery voltage is either above a predetermined high value of 17 volts or less than a predetermined value of 8.5 volts, the microprocessor is operative to provide a signal along output lead 100 to disable the clutch 14 along lead 74.

The microprocessor is reset by voltage from junction 134 which is biased by the five volt regulated supply through resistor R45 as applied to junction 134 which is grounded through capacitor C16, junction 134 being connected to the input reset pin 1 of U3.

An overcurrent protection circuit is provided, indicated generally at 136, and utilizes resistor R37. The output current through drivers Q8, Q9 is sensed by R37 through junction 106. If either the compressor clutch or the fan relay load is shorted, a greater voltage drop occurs across R37; and, this voltage drop is applied through resistors R36, R35 as inputs at pins 2 and 3 of a amplifier comprising device U2. The output at pin 1 of U2 is applied through resistor R39 to the negative input at pin 6 of comparator portion of device U2 which has the positive input at pin 5 biased through resistor R27 to a reference voltage from junction 138. Junction 138 is biased by a voltage divider network comprising resistor R30 and R33 in series with R30 supplied with five volts regulated and R33 grounded, thus providing the voltage:

$$V_{138} = \frac{(R33)}{(R30 + R33)}$$

When the voltage at input pin 6 of comparator U2 is equal to or greater than a reference voltage applied to pin 5 of U2, U2 conducts at output pin 6 through junction 140. Junction 140 is connected to an input of the microprocessor and also along lead 140 through reistor R41 to pin 11 of the positive input of a comparator portion of U1. The negative input pin 10 of a comparator portion of U1 is biased through resistor R42 with $V_{138}$. When the voltage output of U2 at pin 7 as applied to pin 11 of U1 is greater than the reference voltage $V_{138}$, U1 conducts through output pin 13 which is connected to junction 146 which is connected through reverse poled diodes D7, D8 to the base of Q8 and Q9, thereby turning "OFF" Q8 and Q9 and stopping the overcurrent condition. Junction 146 is biased by the system voltage $V_B$ through resistor R44 and the output at pin 13 of U1 has a positive feedback resistor R43 connected to pin 11 at the input of U1.

When the amplifier U2 conducts at pin 1 a capacitor C10 connected between pin 6 of U2 and ground is charged. When Q8 and Q9 are turned "OFF", the voltage drop across R37 ceases and output of U2 at pin 1 goes low; however, C2 maintains a charge on input pin 6 of comparator U2 so that the output of U2 at pin 7 remains low thereby holding Q8 and Q9 "OFF" until capacitor C10 bleeds down through resistor R39. Diode D11 which is forward poled from output pin 1 of U2 to capacitor C10 provides a fast charge path for capacitor C10 and prevents a fast discharge to prevent oscillatory action. D13 is provided for protection against transients or spike due to the inductance of the load.

Referring now to FIG. 3, the microprocessor is powered up to the system twelve volts at step 144 by closure of switch 78 (see FIG. 1); and, at step 146 the minimum compressor "ON" time lag is set for deep cycle.

If the temperature measured by thermistor 88, $T_{88}$, is less than 75 degrees F. then the compressor clutch "ON" time is 7 seconds. If the temperature $T_{88}$ is between 75 and 90 degrees F. then the compressor clutch "ON" time is 60 seconds; and, if $T_{88}$ is greater than 90 degrees F. then a full deep cycle compressor clutch "ON" time is set at 180 seconds.

At step 148 a determination is made whether $T_{88}$ is less than the clutch "OFF" temperature which in the presently preferred practice is 18 degrees F.; and, if $T_{88}$ is not less than 18 degrees F., the compressor clutch 14 and the fan relay 68 are both energized at step 150.

A ten second timer delays, at step 152, the energization of the 18 OHM load resistor R24, for the self-heated thermistor 42 as indicated at step 154.

A determination is made at step 156 as to whether $T_{88}$ is less than the clutch "OFF" temperature of 18 degrees F.; and, if not, then a determination is made at step 158 whether the saturation temperature of the self-heated thermistor $T_{42}$ is greater than the high pressure cut-out temperature which in the presently preferred practice is set at 350 Psi (2415 KPa). If the temperature $T_{42}$ is greater than the HPCO pressure of 350 Psi then the HPCO flag is set at step 160, which in the presently preferred practice is for a period of twenty seconds. Following the twenty second delay in step 160 the clutch is disengaged and the fan is disengaged; and, the self-heat minimum "ON" flag is cleared at step 162.

At step 164, a determination is made as to whether the HPCO flag has timed out; and, if it has, a determination is made at step 166 whether $T_{88}$ is greater than the clutch "ON" temperature which in the presently preferred practice is 40 degrees F. If $T_{88}$ at step 166 is greater than 40 degrees F., the clutch is energized; and, the minimum "ON" flag is set for applying power to the 18 OHM load resistor R24 for a period of seven seconds at step 168.

Returning to step 156, if the temperature $T_{88}$ is less than the clutch "OFF" temperature 18 degrees F., a determination is made at step 170 whether the minimum time has been satisfied; and, if it has, the microprocessor proceeds to step 162. However, if the minimum time at step 170 has not been satisfied a determination is made at step 172 as to whether $T_{88}$ is less than the clutch "OFF" temperature of 18 degrees F.; and, if not, the system proceeds to step 158. However, if $T_{88}$ is less than 18 degrees F. at step 172, the system proceeds to step 162 to disengage the clutch and fan.

Returning to step 158, if the self-heated thermistor temperature $T_{42}$ is not greater than the HPCO pressure of 350 psi, a determination is made at step 174 whether $T_{42}$ is greater than the fan "ON" pressure which is preferably 240 psi (276 KPa); and, if this is the case, the condenser fan is turned on at step 176 and the system returns to step 156. However, if $T_{42}$ at step 174 is not greater than the fan "ON" pressure of 240 psi (1655 KPa) a determination is made at step 178 whether $T_{42}$ is less than the fan "OFF" pressure which is preferably 180 psi (1241 KPa); and, if this is the case, the microprocessor turns "OFF" the condenser fan at step 180, whereupon the system returns to step 156. However, if it is determined at step 178 that $T_{42}$ is not less than the fan "ON" pressure of 240 psi,, the system returns to step 156 with the condenser fan remaining on.

Values of resistances and capacitances and device designations are given in Table I.

TABLE I

| Resistances OHMS | | Capacitance MicroFarads | | Other Devices | |
|---|---|---|---|---|---|
| | | C1,3,5 | .1 | U1 | LM239 |
| | | C2 | 1.0 | U2 | LM2940D |
| R4 | 1 K | C4,4 | 0.001 | U3 | MC68HC04TK |
| R5,7 | 10 K | C6,7 | .1 | U4 | 555 |
| R8,9 | 920 K | C 8 | .01 | U5 | MC7805BTD |
| R1014 13 | 22 K | C10 | .15 | D1 | 5.IVZ |
| R14,16-18 | 15 K | C11 | .001 | D2 | 6.2V |
| R15 | 62 K | C12 | .1 Metflm | D3,5,6 | MMBD914 |
| R17 | 1.5 K | C13,14 | .1 | D4 | 10VZ |
| R19 | 3.0 K | C19,16 | 3.3 | D7,8,10 | MMBD914 |
| R20 | 100 | | | D9 | RLR4004 |
| R21 | 200 K | | | D11 | MMBD914 |
| R22 | 2.2 K | | | D12 | RLR4004 |
| R23 | 270 K | | | D13 | TGL-41-51 |
| R24,41 - 18 - 2W | | | | D14 | MLL4746,18V |
| | | | | D15 | RLR4004 |
| R25,26 | 10 K | | | Q3 | MJD31C |
| R27 | 9.1 K | | | Q4-6 | MMBD3904 |
| R28,29 | 2200 | | | Q8,9 | IFR020 |
| R30-36 | 10 K | | | | |
| R37 | .006 | | | | |
| R38,40,43 | 100 K | | | | |
| R39 | 330 K | | | | |
| R41,41,44 | 22 K | | | | |
| R45 | 33 K | | | | |

The present invention thus provides a unique and novel control system for a refrigeration or air conditioning system wherein a mechanical thermal expansion valve is employed but thermistors are disposed in the system to sense temperature electrically thereby enabling a microprocessor controller to provide control signals for the electrically operated compressor clutch and condenser fan motor. The present invention employs a self-heated thermistor at the inlet or high pressure side of the thermal expansion valve to enable determination of saturation pressure in the high pressure side of the system for providing signals to cycle the condenser fan. A direct refrigerant temperature sensing thermistor is employed at the evaporator outlet, or alternatively the evaporator inlet for low pressure drop evaporators, to enable a determination of saturation temperature from a look-up table of refrigerant properties to provide an electrical control signal for cycling the compressor clutch.

The present invention thus provides a unique and novel system for electronically controlling the compressor clutch and condenser fan in an air conditioning system and yet permits the use of a economical and reliable mechanical thermal expansion valve.

Although the invention has hereinabove been described with respect to the illustrated embodiments, it will be understood that the invention is capable of modification and variation and is limited only by the following claims.

We claim:

1. A refrigerant control system comprising:
    (a) pump means including condenser means providing a source of pressurized liquid refrigerant;
    (b) expansion valve means with a body having an inlet and outlet including conduit means operative to communicate pressurized liquid refrigerant from said pump means to the inlet thereof and having a valve member disposed in said body and movable therein for controlling flow of said liquid to said outlet for expansion;
    (c) blower means operative for circulating air over said condenser means;
    (d) evaporator means having an inlet and outlet and connected for receiving refrigerant flow at the inlet thereof from the outlet of said valve means and operative to absorb heat from a compartment to be refrigerated and effect vaporization of said refrigerant for discharge at the outlet thereof;
    (e) said valve means body including a continuous passage therethrough connected to receive refrigerant flow from said evaporator means outlet and discharge refrigerant flow to the inlet of said pump means;
    (f) said valve means further including actuator means responsive to the temperature of the refrigerant in said continuous passage operable for moving said valve member;
    (g) first thermistor means disposed in said inlet of said valve means body and including current limiting resistance means electrically in series with said thermistor means;
    (h) first circuit means operative to provide a flow of current to said thermistor means sufficient to cause boiling of refrigerant coming into contact therewith including means operative to determine the temperature of said flow at said boiling;
    (i) second circuit means operative to compare said temperature with saturation values in a look-up table and convert said temperature to saturation pressure, said second circuit means operative to cycle said blower means responsive to said pressure;
    (j) second thermistor means disposed at the outlet of said evaporator for sensing the temperature of the flow of refrigerant thereof; and
    (k) second circuit means receiving a signal from said second thermistor means and operative to energize said pump means when said sensed temperature is greater than a predetermined "ON" temperature and operative to deenergize said pump means when said sensed temperature is less than a predetermined "OFF" temperature.

2. The system defined in claim 1, wherein said first circuit means is operable to deenergize said pump means when said saturation pressure is less than a predetermined value indicative of low refrigerant charge.

3. The system defined in claim 1, wherein said first circuit means includes means operative to select a value from a plurality of values of current for flow through said thermistor.

4. The control system defined in claim 1, wherein said evaporator means has a pressure difference between the inlet and outlet thereof not greater than 20 psi (138 KPa) and said second thermistor means is disposed at the inlet of said evaporator.

* * * * *